United States Patent [19]
Girdley

[11] Patent Number: 4,834,340
[45] Date of Patent: May 30, 1989

[54] QUARTER-TURN PLUG VALVE HAVING ADJUSTABLE BONNET AND TAPERED RAISED VALVE SEATS

[75] Inventor: Harry W. Girdley, Louisville, Ky.

[73] Assignee: Henry Vogt Machine Co., Louisville, Ky.

[21] Appl. No.: 233,488

[22] Filed: Aug. 17, 1988

Related U.S. Application Data

[63] Continuation-in-part of Ser. No. 72,114, Jul. 10, 1987, Pat. No. 4,776,566.

[51] Int. Cl.⁴ .............................................. F16K 25/00
[52] U.S. Cl. .................................... 251/368; 251/164; 251/288; 137/315
[58] Field of Search ............. 251/359, 368, 328, 164, 251/286, 288; 137/15, 315; 29/157.1 R

[56] References Cited

U.S. PATENT DOCUMENTS

| | | | |
|---|---|---|---|
| 688,298 | 4/1901 | Foss | 251/164 |
| 845,540 | 2/1907 | Ferguson et al. | 251/164 |
| 1,473,210 | 5/1923 | Costello | |
| 2,076,841 | 12/1937 | Heggem | 251/164 |
| 2,182,930 | 12/1939 | Nordstrom | 251/288 |
| 2,633,326 | 3/1953 | Givens | 251/164 |
| 2,858,097 | 4/1958 | Blomstran et al. | 251/164 |
| 3,429,553 | 4/1969 | Smith | 251/164 X |
| 4,239,185 | 12/1980 | Lowe | 251/164 |

FOREIGN PATENT DOCUMENTS

917687 8/1959 United Kingdom ............... 251/164

Primary Examiner—A. Michael Chambers
Attorney, Agent, or Firm—William R. Price

[57] ABSTRACT

A quarter-turn plug valve has an inverted and tapered frustoconical body cavity and plug. The valve body has a through-flow passage with ports opening into said body cavity. The tapered plug has a valve stem and a throughflow passage. The valve seats surround the ports and extend from the walls of the tapered valve cavity toward the plug. The plug, when seated in closed position, is in physical contact only with the annular tapered faces of the valve seats. The valve stem contains acme or square threads near the bottom to engage with a bonnet threaded at its lower end. The bonnet extends axially along the valve stem and has a projecting flange near its midpoint, which seats on a gasket placed between it and the valve body flange. When the plug is properly oriented in closed position, the adjustable bonnet is turned on the threads of the valve stem with the stem fixed until it seats on the valve body with the desired downward thrust. A bonnet flange is then bolted to the valve body to hold the bonnet and stem and plug assembly properly adjusted and seated in closed, no-flow position inside the valve cavity. The valve stem is square at the top, with the plane of one side of the square being in line with the opening of the flow-through passage. Therefore, a handle mounted on the valve stem will indicate whether the valve is in open-flow position or in closed, no-flow position.

10 Claims, 4 Drawing Sheets

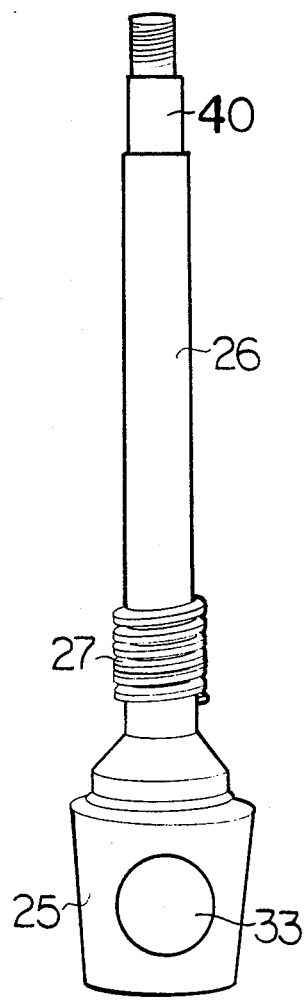
FIG. 4
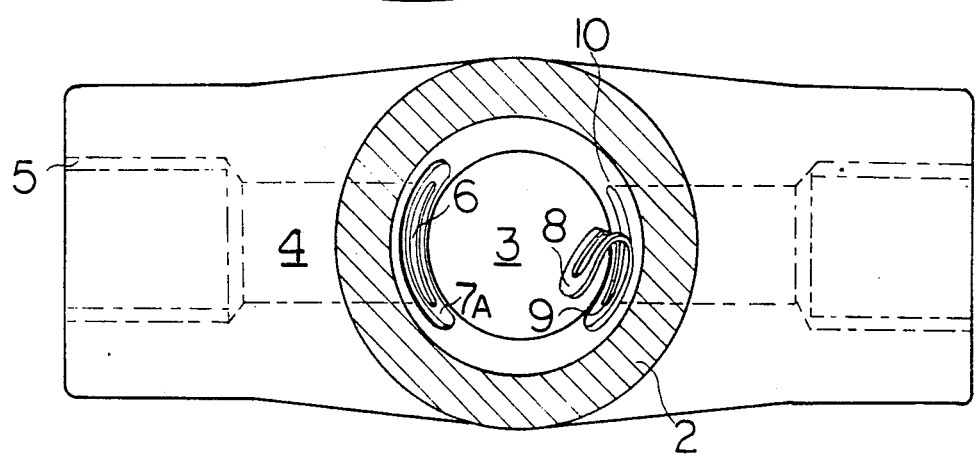
FIG. 3 SECTION A-A

QUARTER-TURN PLUG VALVE HAVING ADJUSTABLE BONNET AND TAPERED RAISED VALVE SEATS

CROSS-REFERENCE TO RELATED APPLICATIONS

This application is a continuation-in-part of co-pending application Ser No. 072,114, filed July 10, 1987 now U.S. Pat. No. 4,776,566 issued Oct. 11, 1988.

FIELD OF THE INVENTION

This invention relates to metallic valves. More specifically, this invention relates to plug valves of the quarter-turn variety with metallic seats. Still more specifically, this invention relates to a quarter-turn plug valve having an elongated adjustable bonnet, which, in combination with a threaded valve stem, allows for a wide range of opening and closing torques.

DESCRIPTION OF THE PRIOR ART

Applicant is aware of the following prior art patents:

| PATENT NUMBER | INVENTOR | DATE |
| --- | --- | --- |
| 688,298 | Foss | 1901 |
| 845,540 | Ferguson, et al | 1907 |
| 1,473,210 | Costello | 1923 |
| 2,076,841 | Heggem | 1937 |
| 2,633,326 | Givens | 1953 |
| 2,858,097 | Blomstran, et al | 1958 |
| 3,429,553 | Smith | 1969 |
| 4,239,185 | Lowe | 1980 |

Quarter-turn plug valves are known in the art. These valves contain a plug with a through-flow passage, which can be operated from a full open position to a full closed position with one-quarter of a turn. The bearing surface, however, between the plug and the body cavity is large, and consequently, a relatively large force is necessary to open or close it. As a consequence, many of these plug valves require a lubricant injected between the inverted frustoconical wall of the body cavity and the inverted frustoconical wall of the plug. Use of a lubricant, however, imposes certain temperature limitations on the valve, as well as limitations as to the use of the valve. Lubricants are not suitable for use with food products, for example.

Another problem with the quarter-turn valves is the difficulty of aligning the plug properly in the body cavity. In the closed position, for example, the through-flow passage of the plug must be transversely located relative to the through-flow axis of the valve body. Simultaneously, in closed, no-flow position, the plug must seat with the seats surrounding the ports of the through-flow passage of the valve body. Ferguson, in U.S. Pat. No. 845,540, utilized a circular plate, having a series of notches which would engage with grooves 21 of the regulating plate. Since 12 grooves were provided on the plate, the incremental adjustment for each of the 12 grooves equaled 360°/12, or 30° apart. Therefore, the through-flow passages between the plug and the valve body could vary from 0° to 30°. Costello, in U.S. Pat. No. 1,473,210, attempted to use a mounting nut 14 in threaded engagement with the stem 19. Costello, however, did not provide a seat for the nut 14, but secured it into position by means of a pin 16. Since the nut was secured prior to assembly it was difficult to achieve infinite adjustment. Lowe, in U.S. Pat. No. 4,239,185, provided for infinite adjustment by means of a nut 46, threaded onto the stem. The nut was seated within the body 12. Thereafter, the bonnet 14 was secured into place.

Lowe did provide for tapered valve seats which extended past the wall of the body cavity toward the tapered wall of the plug, so that bearing pressure between the plug and the seats was minimized. Thus, upon seating the plug with the through-flow passage of the valve body, the only bearing pressure was between the surface of the seats and the affected area of the plug. Therefore, upon turning the valve stem one-quarter of a turn, the plug was turned and raised slightly, requiring only the pressure required to break the seating seal between the plug and the seats.

SUMMARY OF THE INVENTION

The quarter-turn valve of the invention utilizes raised seats which are tapered to conform with the taper of the inverted frustoconical plug. This minimizes the opening and closing torque because of the reduced bearing surface between the seats and the plug. In order to properly orient the through-flow passage of the plug with the through-flow passage of the bonnet, during assembly, the stem and plug assembly is fitted into the bonnet so that the threads of the stem engage the bonnet threads. The plug is fitted into the frustoconical cavity so that the through-flow passage of the plug extends perpendicularly to the major axis of the through-flow passage of the valve body. The bonnet, then, is turned, in relation to the stem (held in fixed position) which, by means of the threads on both the bonnet and the stem, lowers the plug into the cavity. When the wall of the frustoconical plug sealingly engages the raised surface of the tapered valve seats, the bonnet flange is placed over the assembled stem and bonnet and bolted to the body. The annular flange of the bonnet compresses the gasket and seats on the upper surface of the annular flange of the body. The proper location of the plug, therefore, ensures the proper sealing engagement of the plug with the seats and assures that upon turning of the plug one-quarter of a turn, the through-flow passage of the plug will register with the through-flow passage of the valve cavity. In making the quarter-turn, the valve plug breaks the seal and is raised slightly as it is turned, to reduce any friction between the plug and the valve seats. The top of the valve stem is machined square, so that one plane of the square is in line with the opening of the through-flow passage of the plug. Thus, the handle, when mounted on the squaremachined surface of the stem, is positioned so that the handle lies transversely to the major axis of the through-flow passage of the valve body in closed position and lies in line with the major axis of the through-flow passage of the valve body in open position. Thus, workers in the field can immediately determine whether the valve is open or shut by the position of the valve handle.

BRIEF DESCRIPTION OF THE DRAWINGS

FIG. 3 is a sectional view, taken along Section A—A of FIG. 1A, with the plug removed and part of the fabricbacked component pulled away on one side, to show the metal prepared for installation of the hardface fabric-backed composite and the complete composite adhesively secured onto the prepared metal surface surrounding the valve port on the other side of the valve cavity.

FIG. 4 is a view, in elevation, of the plug with a permanently-attached threaded stem for the quarter-turn valve of FIG. 1A. This view shows the squared machined surface at the handle end of the valve stem, in which one face of the square is in line with the opening of the through-flow passage of the plug.

DESCRIPTION OF THE PREFERRED EMBODIMENT

Figure 1A:
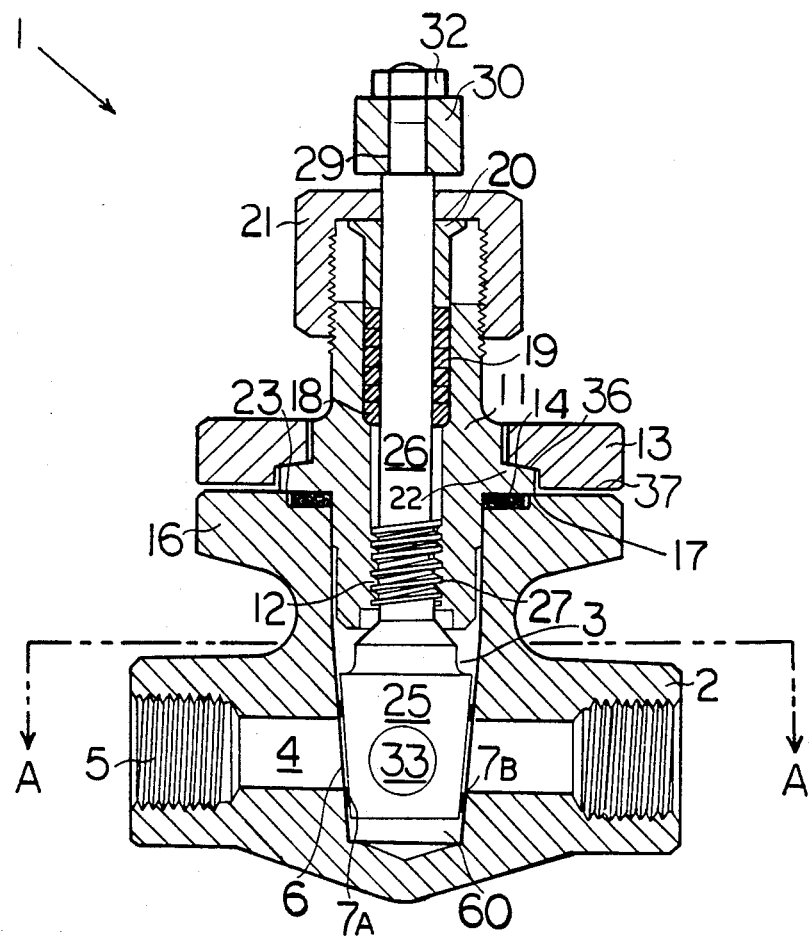
FIG. 1A is a sectional view of the valve of this invention, shown in closed, no-flow position, with the plug seated against the raised seats surrounding the ports of the through-flow passage of the valve body and with the through-flow passage of the plug located at 90° from the long axis of the through-flow passage of the valve body.

The invention is applicable to plug valves and particularly to a quarter-turn through-flow plug valve. In a preferred embodiment, this invention relates to hardface raised valve seats, but is applicable to tubular ring type seats. The valve 1 consists of a body 2, having a cavity 3 of an inverted frustoconical shape. The throughflow passage 4 extends from the threaded portion 5 to port 6 into the cavity 3. The port 6 is surrounded by hardface raised seats 7A and 7B which extend from the wall of the cavity 3 toward the plug 25. The hardface raised seats are formed from a fabric-backed hardface composite 8 (FIGS. 2A and 2B) which will be described in more detail hereinafter. Suffice it to say that the composite is cut so as to form an opening 9 to conform to the port 6 and the hardface fabric composite is adhesively secured, in a preferred embodiment, to the periphery of port 6. The metal 10 surrounding the port is prepared by grit blasting or by pickling, so as to accept the fabric-backed hardface composite. A bonnet 11, containing threads 12 and an annular flange 22, is fitted onto valve stem 26 and is turned so as to seat with a first seat 17 on the upper surface of annular flange 16 of the body 2 of the valve. Bonnet flange 13, the bonnet and valve stem plug assembly are secured to the body portion by bolts 38. A spiral-wound, graphite-impregnated gasket 14 is inserted between the body and the bonnet to prevent leakage around this area of contact. The plug 25 contains a through-flow passage 33.

ASSEMBLY

During assembly, stem 26 is fitted into bonnet 11 so that stem threads 27 engage bonnet threads 12. The plug is fitted into the frustoconical cavity 3 so that the through-flow passage 33 extends perpendicularly to the major axis of the through-flow passage 4 of body 2. Bonnet 11 is turned in relation to stem 26 which lowers the plug 25 in the cavity 3. When the wall of the frustoconical plug sealingly engages the raised surface of valve seats 7A and 7B (closed position), the bonnet 11 is turned until the lower surface 23 of annular flange 22 compresses gasket 14 and seats with the first seat 17 on the upper surface of annular flange 16 of the valve body 2. Bonnet flange 13 is then closed over the stem, plug and bonnet assembly and bolted to body 2 with bolts 38. Bonnet flange 13 has a recessed shoulder 36 on its lower surface 37 which fits over the upper surface of the annular flange 22 of bonnet 11. Therefore, bolting of the bonnet flange with bolts 38 onto the body 2 assures proper sealing force of the plug 25 against the seats 7A and 7B and proper orientation of the through-flow passages 33 and 4 in the closed position. In a preferred embodiment, the plug and the stem are unitary, i.e. machined or cast from a single piece of metal. As illustrated in FIG. 1A, the stem is surrounded by a series of packing rings 19, which are held in position by a packing gland 20, which is secured to the bonnet 11 by a packing nut 21. A metal packing ring 18 prevents extrusion of the packing rings around the stem 26. The stem 26 extends through the bore of the packing nut 21 and is attached by a handle 30 which extends over into a lever arm 31 and is held in place by a lock nut 32. The handle of lever arm 31 is designed to extend in the direction of fluid flow when the valve is in open position and perpendicular to fluid flow when the valve is in closed position. The end of stem 26 is machined square to form a square face 40, as shown in FIG. 4, to engage the square bore 29 of handle 30. The square face is in direct line with the port of through-flow passage 33 of plug 25. Thus, the square bore 29 of handle 30 can be perfectly aligned to show when the valve is in closed or open position by reference to the orientation of the handle 30 and lever arm 31. As previously indicated, the lever arm turns only one-quarter of a turn from open (limited by a stop pin 39 mounted on bonnet flange 13) to valve closure against seats 7A and 7B. The plug, in closed position (as shown in FIG. 1A) wedges across the raised seats 7A and 7B on either side of the cavity and the lever handle is arranged with its long axis perpendicular to the long axis of the through-flow passage 4 of the valve body. Since the hardface seat is fused onto the wall of the valve body cavity surrounding the port, the valve can accommodate high temperatures and does not require a great deal of torque to turn from open to closed position. This is because the only contact of the plug is in the vicinity of the raised seats 7A and 7B and turning of the valve plug 25 a quarter of a turn raises the plug to an area of smaller diameter, therefore relieving the compression of the plug against the seats 7A and 7B. This allows for easy movement from closed to open. In closing the valve, the movement of the lever arm 31 is in the opposite direction, which turns the through-flow passage 33 away from the port 6 and lowers the plug 25 as it is turned into wedging position against the raised seats 7A and 7B, thus sealing the valve against flow-through passage 33 of plug 25.

Figure 6:
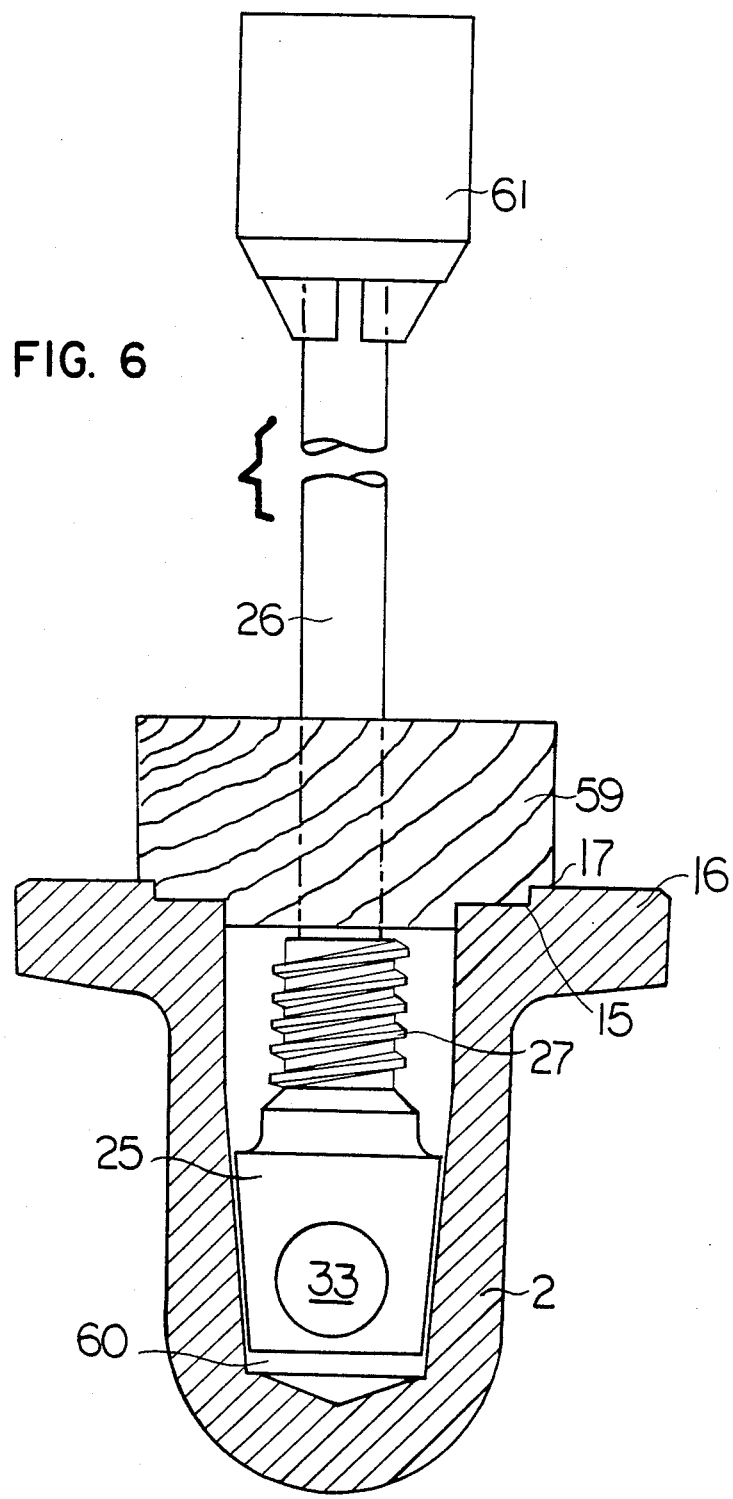
FIG. 6 is a sectional view, illustrating the lapping guide and the relationship of the valve plug and stem in field lapping of the valve seat of the invention.

The tools for effecting the relapping procedure are shown in FIG. 6. A lapping fixture 59 is fitted over the body 2 of the valve and this, as is illustrated, may be made of plastic, wood or metal. The purpose of the lapping guide 59 is to maintain the stem in proper orientation during rotation of the plug 25 at low speeds against the surface of the raised seats 7A and 7B. The stem 26 extends through the bore of the lapping guide 59 to a chuck 61, which is driven at low speeds by a variable-speed drill (not shown). The plug 25 and valve stem 26 are used to lap the seat surfaces 7A and 7B as illustrated in FIG. 6, in use with the lapping guide 59.

RAISED HARDFACE OVERLAY VALVE SEAT

The hardface overlay raised valve seats 7A and 7B, according to a preferred form of this invention, are prepared from a fabric-backed hardface alloy composite. Such composites have been described in U.S. Pat. Nos. 3,743,556; 3,916,506; 3,864,124 and 4,194,040.

Figures 2A, 2B:
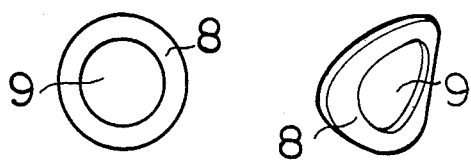
FIGS. 2A and 2B illustrate an elevational and perspective view of a fabric-backed component, including a fibrillated polymer, having hardfacing alloy particles embedded therein, which has been cut and viewed to fit the periphery of the port of the through-flow passage of the valve.
Figure 5:
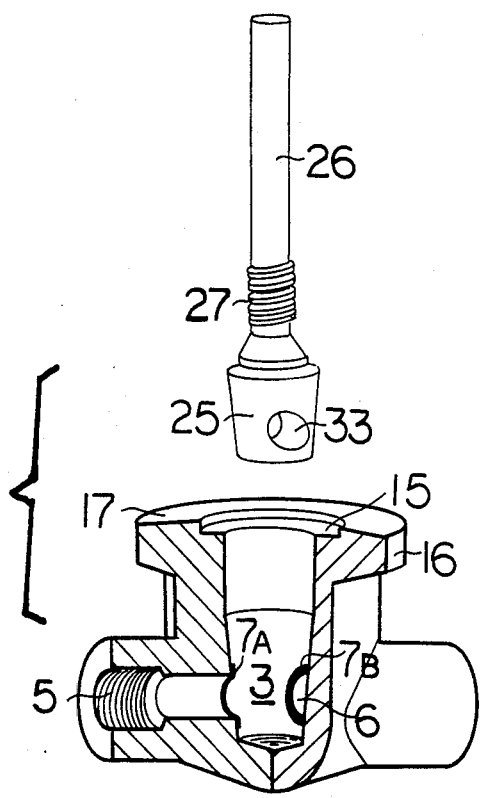
FIG. 5 is a perspective view of some parts of the quarter-turn valve of FIG. 1A with the stem and plug raised for purposes of illustration.

In order to control the shape of the seat as it is applied around the periphery of the port 6, a fabric-backed hardface composite is formed in which the fabric consists of fibrillated polytetrafluoroethylene. The metal particles are mixed into the fibrils of polytetrafluoroethylene (Teflon ®)* which entrap the powder particles. Many different alloys can be utilized (see Shewell, Dennis E.**). However, in a preferred embodiment, a nickel-chromium-boron alloy is embedded into a fibrillated polytetrafluoroethylene and formed into a fabric-like material. A cobalt alloy powder is mixed with the fibrillated polytetrafluoroethylene and the two sheets, or lamina, of the composite are joined together and formed into a single sheet. Thereafter, the laminated hardface composite is cut into the desired shape, as is shown in FIGS. 2A and 2B.

*Registered trademark of E. I. DuPont de Nemours.
Shewell, Dennis, E. "New Method of Applying Wear-Resistant Coatings," p. 1–6, *Metal Progress,* November, 1983.

The powdered materials, in the past, have included various refractory materials, as for example, titanium carbide and the like. However, it has been found that cobalt particles tend to give to the overlay antigalling and corrosion-protection characteristics. Thus, the overlay material may be described as one with islands of cobalt in a matrix of nickel-chrome-boron alloy.

Once the fabric particle component is cut to the desired shape, it is adhesively secured to the treated, prepared metal 10, FIG. 3, surrounding the port 6, by glue, shellac or the like.

The valve body base metal 10 is preferably prepared by an acid pickling treatment or by a grit blast, as described by Shewell and as is well known in the art.

Thereafter, the entire treated valve body is heated in a hydrogen atmosphere or other controlled atmosphere at temperatures so as to vaporize the Teflon ® or polytetrafluoroethylene and to braze the nickel-chromium-boron alloy and the cobalt particles and fuses them to the steel valve body surface. While the furnace brazing atmosphere is controlled, there are other methods of applying hardfacing, such as laser beams, plasma-arc welding, induction brazing, diffusion techniques, vacuum brazing and the like.

The semi-finished valve body has a raised hardface overlay alloy seat fused to the wall of the metal of the body cavity. The raised hardface overlay alloy seat extends from the wall of the body cavity 3, toward the plug 25. The seats 7A and 7B do not extend through the port 6 into the through-flow passage 4. This is of considerable importance, since there is no possibility of developing a leak or cavitation between the seats 7A and 7B and the wall of the port 4, as has been the case with the tubular ring valve seats in which the tube extends into the through-flow passage 4 of the valve body.

Thereafter, the raised seats are machined, lapped by conventional processes and assembled in the factory. The valve is ready for installation thereafter in the field.

FIELD LAPPING

One of the major advantages of the raised overlay valve seats of this invention resides in the fact that the valves can be lapped in the field.

As previously indicated, the plug 25 and valve stem 26 are utilized with the lapping guide 59, illustrated of wood (see FIG. 6).

In order to field lap the valves, it is necessary, of course, to take the valve out of service and to remove the bonnet flange 13 and the bonnet 11 and the valve stem 26. The stem 26 is then removed from the bonnet 11. Thereafter, the valve stem 26 and plug 25 are inserted through the bore in the lapping guide 59, which is attached to the flange 16 of the valve body 2. Lapping compound is applied directly to the plug and the stem 26 is inserted into a chuck 61 and driven at low speeds, in contact with the surface of the seats. Various commercial lapping compounds are available, but a 180 grit, water- or oil-based silicon carbide material is preferred. It is also possible, of course, to use diamond powder in an oil or water base as the lapping compound.

FIELD ASSEMBLY

Since the lapping of the seats with the plug changes the orientation of the through-flow passage 33 of the plug 25 with the major axis of the through-flow passage 4 of the valve body 2, it is necessary to reassemble the valve after lapping. This involves orienting the transversely-extending through-flow passage 33 of the plug 25 at right angles to the major axis of the through-flow passage 4 of the valve body 2. The bonnet 11 is then turned in relation to stem 26, and by engagement of threads 12 and 27, moves plug 25 downward so that it again sealingly engages seats 7A and 7B. The lower surface 23 of the annular flange 22 of bonnet 11 engages the first seat 17 on the annular flange 16 of the valve body 2. This ensures that the frustoconical wall of plug 25 is in sealing engagement with the raised surface of the hardface valve seats 7A and 7B. Thereafter, the bonnet flange 13 is fitted over the stem and bonnet assembly so that the recess 36 of the lower surface of the bonnet flange 13 engages the upper surface of the annular flange 22 of bonnet 11 and is bolted to the valve body by bolts 38. This, then, assures proper orientation of the transversely-extending through-flow passage 33 of plug 25 and through-flow passage 4 of the valve body 2 in the position of valve closure, even after one or more lapping procedures.

There is an area of space left in the bottom of the valve cavity 3, which is designated by numeral 60 as the relap life. This space, then, allows for the valve seats 7A and 7B to be relapped several times in the field before the valve plug 25 finally contacts the bottom of the valve cavity.

FIELD ADJUSTMENT

Figure 1B:
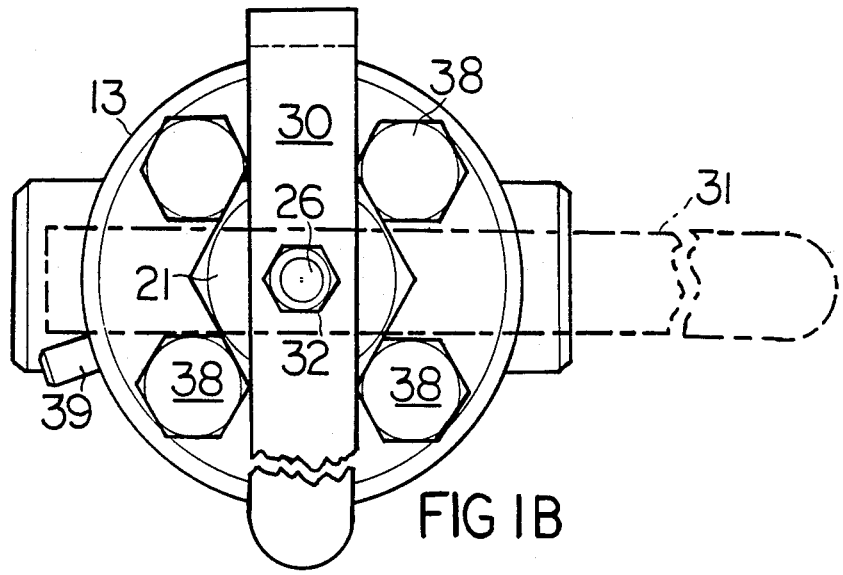
FIG. 1B is a projection of FIG. 1A, viewing the valve from the top and showing the handle in closed position in full lines and in open position in phantom lines.

In instances in which the handle and lever 31 overtravels more than 90° in going from open to closed position, as shown in FIGS. 1A and 1B, adjustment of the plug and stem assembly is indicated. Over-travel of the handle can be indicative of wear of the apparatus. In many instances, where there is a drip drain line, the operator knows there is no leakage, so that relapping and subsequent field assembly is not required. Nevertheless, to maintain proper orientation of the plug 25 against seats 7A and 7B, while maintaining the required downward thrust to assure sealing closure in closed position, as shown in FIG. 1A and to maintain proper orientation of the through passage 33 of the plug with the through-flow passage 4 of the valve body, as illustrated in Figs. 1A and 1B, it is proper to adjust the plug in the field. All that is required is the loosening of bolts 38 to decrease the pressure of the bonnet flange 13 against the upper surface of the annular flange of bonnet 11, so as to allow the bonnet 11 to be turned sufficiently to make this adjustment. Thereafter, the bolts 38 are tightened, so as to force the lower surface of the bonnet flange 13 and the recessed shoulder 36 of the bonnet flange into metal-to-metal contact with the upper surface of the annular flange 22 of bonnet 11. This, then, forces the lower surface 23 of the annular flange of bonnet 11 into metal-to-metal contact with the seat 17 of the annular flange 16 of valve body 2 and compresses the graphite-impregnated gasket 14 into the gasket recess 15 to completely seal the assembly against leakage. This is all accomplished in the field in a few minutes, without the necessity of completely dismantling the valve. This is made possible because of the external adjustment feature afforded by the adjustable bonnet of this invention.

Many modifications will occur to those skilled in the art from the detailed description hereinabove given. Such description is meant to be nonlimiting, except insofar as to be commensurate in scope with the appended claims.

I claim:
1. A valve comprising:
A. a metallic body, having:
   1. a body cavity defining an inverted frustoconical wall;
   2. a through-flow passage;
   3. a port on each of the opposite sides of the frustoconical wall of said body cavity, said port communicating with said body cavity and said through-flow passage;
   4. a first seat on said body;
B. a metal plug, having:
   1. an inverted frustoconical wall surface, parallel to the frustoconical wall of said body cavity and extending into said body cavity across the through-flow passage of said valve body;
   2. a transversely-extending through-flow passage;
C. a valve stem, having a threaded portion at its lower end and a handle portion at its upper end;
D. a second and third metal seat, surrounding the port on the opposite sides of said cavity, said second and third seats:
   1. extending from the wall of said body cavity toward said plug, and
   2. being tapered to conform with the taper of the frustoconical surface of said plug;
E. an infinitely adjustable, vertically-elongated bonnet, having:
   1. a recess at its lower end;
   2. a threaded bore directly above said recess for engagement of the threads of the valve stem;
   3. said bonnet being freely rotatable around the threads of said valve stem and in contact with said first seat on said valve body, said threaded bore coacting with said threads of said valve stem, to move said valve stem through an infinite range of vertical adjustment and bring the plug into seated position against said second and third metal seats in closed, no-flow position;
F. a bonnet flange, surrounding said bonnet;
G. bolt means for clamping said bonnet flange in fixed position on said valve body and for securing said bonnet and said valve stem and plug in proper rotational position throughout a wide range of opening and closing torques;
H. a handle, mounted on the upper end of said valve stem with its long axis extending transversely to the axis of the valve body's through-flow passage when the plug is in the closed, no-flow position and which may be rotated a quarter-turn:
   1. to bring the long axis of the handle into alignment with the through-flow passage of the valve body;
   2. to move said plug with a vertically-upward and rotational movement out of engagement with said metals seats; and
   3. to bring the transversely-extending through-flow passage of said plug into registry with the ports of said through-flow passage of said valve body in open-flow position.

2. A valve, as defined in claim 1, in which said valve body has a center portion, having an outwardly-extending annular flange, on which said first metal seat is located on the upper surface of said annular flange.

3. A valve, as defined in claim 1, in which said vertically-elongated bonnet has an outwardly-extending annular flange, having a lower surface which seats with said first seat.

4. A valve, as defined in claim 2, in which:
   1. said outwardly-extending annular flange contains a recess, in combination with a gasket mounted in said recess.

5. A valve, as defined in claim 1, in which said valve stem and said metal plug are unitary.

6. A valve, as defined in claim 1, in combination with a stop which limits movement of said handle and the valve stem attached thereto to a quarter-turn.

7. A valve, as defined in claim 1, in which said stop is mounted onto said bonnet flange.

8. A valve, as defined in claim 3, in which said bonnet flange has an annular recess which sealingly engages the upper surface of the annular flange of said infinitely adjustable bonnet.

9. A valve, as defined in claim 1, in which:
A. said handle portion of said valve stem is machined to produce a plurality of equally-spaced flat faces;
B. one of said flat faces being in alignment with the opening of the transversely-extending passage of said plug;
C. said handle, having an internal opening of complementary, equally-spaced flat faces to those of said valve stem.

10. A valve, as defined in claim 9, in which said flat faces of said valve stem define a square.

* * * * *